US011445770B2

United States Patent
Williams et al.

(10) Patent No.: US 11,445,770 B2
(45) Date of Patent: *Sep. 20, 2022

(54) PROTECTIVE FOAM MATERIAL AND PADS

(71) Applicant: Russell Brands, LLC, Bowling Green, KY (US)

(72) Inventors: Greg Williams, Auburn, AL (US); Dana Marquez, Auburn, AL (US); Steven Wayne Kesterson, Bowling Green, KY (US); Kevin Lunsford, Bowling Green, KY (US)

(73) Assignee: RUSSELL BRANDS, LLC, Bowling Green, KY (US)

( * ) Notice: Subject to any disclaimer, the term of this patent is extended or adjusted under 35 U.S.C. 154(b) by 354 days.

This patent is subject to a terminal disclaimer.

(21) Appl. No.: 16/813,055

(22) Filed: Mar. 9, 2020

(65) Prior Publication Data

US 2020/0205490 A1 Jul. 2, 2020

Related U.S. Application Data

(63) Continuation of application No. 14/229,170, filed on Mar. 28, 2014, now Pat. No. 10,582,731, which is a
(Continued)

(51) Int. Cl.
*B32B 7/12* (2006.01)
*A41D 13/05* (2006.01)
*B32B 5/24* (2006.01)
*A63B 71/12* (2006.01)
*B32B 5/02* (2006.01)
(Continued)

(52) U.S. Cl.
CPC .......... *A41D 13/0512* (2013.01); *A63B 71/12* (2013.01); *B32B 5/028* (2013.01); *B32B 5/245* (2013.01); *B32B 7/12* (2013.01); *A63B 71/081* (2013.01); *A63B 2071/1208* (2013.01); *A63B 2102/14* (2015.10); *A63B 2102/18* (2015.10); *A63B 2102/182* (2015.10); *A63B 2102/22* (2015.10); *A63B 2209/10* (2013.01); *A63B 2243/0066* (2013.01); *B32B 2262/106* (2013.01); *B32B 2266/0221* (2013.01); *B32B 2266/0278* (2013.01); *B32B 2266/06* (2013.01); *B32B 2266/08* (2013.01); *B32B 2307/558* (2013.01); *B32B 2437/00* (2013.01);
(Continued)

(58) Field of Classification Search
CPC ........ A41D 13/0512; A63B 2071/1208; A63B 2102/14; A63B 2102/18; A63B 2102/182; A63B 2102/22; A63B 2209/10; A63B 2243/0066; A63B 71/081; A63B 71/12; B32B 2262/106; B32B 2266/0221; B32B 2266/0278; B32B 2266/06; B32B 2266/08; B32B 2307/558; B32B 2437/00; B32B 5/028; B32B 5/245; B32B 7/12; Y10T 428/24322; Y10T 428/24992
See application file for complete search history.

(56) References Cited

U.S. PATENT DOCUMENTS 10,582,731 B2 * 3/2020 Williams ............... A63B 71/12

* cited by examiner

*Primary Examiner* — Lawrence D Ferguson
(74) *Attorney, Agent, or Firm* — Jacob Neu; Bradley Arant Boult Cummings LLP (57) ABSTRACT

A protective foam material and pads are disclosed herein. The material is a rounded foam pellet having a hole through the center of the pellet. The pellets may be arranged and interconnected to form a pad. These pads may be applied to persons, animals, or other objects for protective functions.

5 Claims, 5 Drawing Sheets

Related U.S. Application Data continuation-in-part of application No. 13/835,079, filed on Mar. 15, 2013, now abandoned.

(51) Int. Cl.
*A63B 102/18* (2015.01)
*A63B 71/08* (2006.01)
*A63B 102/14* (2015.01)
*A63B 102/22* (2015.01)

(52) U.S. Cl.
CPC ................. *Y10T 428/24322* (2015.01); *Y10T 428/24992* (2015.01)

PROTECTIVE FOAM MATERIAL AND PADS

REFERENCE TO PRIOR APPLICATION

This is a continuation of currently pending U.S. patent application Ser. No. 14/229,170, filed on Mar. 28, 2014, which is a continuation-in-part of application Ser. No. 13/835,079, filed Mar. 15, 2013.

FIELD OF THE INVENTION

The invention relates generally to protective equipment for absorbing, dispersing, or deflecting impact shock. The invention has particular application to athletic padding or protective equipment.

BACKGROUND ART

Foam pads have long been used for various types of personal protection equipment in athletics, such as shoulder pads, knee and thigh pads, elbow pads, athletic supporters, and helmets. Foam pads are commonly constructed of large, uniformly thick foam sheets to cover a particular region. Such pads are bulky and limit an athlete's mobility. These pads also do little to disperse the energy absorbed from an impact. While the foam pad absorbed some energy and force, what is not absorbed passes through the foam in the same direction as the direction of impact. Stated differently, when the foam is impacted, unabsorbed force passes straight through the pad to the underlying region.

More recently, it has become popular to score or pellet certain panels of foam padding into small units, such as hexagons or squares, to allow the pad to more easily curve or flex about a rounded surface, and thereby to closely conform to the body. While this in theory may in some cases accommodate an athlete's mobility, it does not address the manner in which the padding absorbs, disperses, or deflects forces, which typically are passed in a substantially straight line vector through the pad to the underlying area intended for protection. In fact, traditional padding, whether segmented or not, relies substantially only on the padding's ability to absorb impact forces, while not much attention has been given to dispersing or deflecting forces.

The traditional design of football shoulder pads evidences a reluctance to rely upon the protective absorbing, being traditionally designed to sit raised above the wearer's shoulders. In such configuration, the shoulder pad is designed to deflect downward to absorb force, while a hard yoke component flexes to absorb additional energy. However, such pads suffer from a higher-than-desired profile and can impair a wearer from being able to comfortably turn his neck or easily raise his arms. While shoulder pads having increased flexibility would be welcomed, reducing the size of a conventional pad may increase the potential force impacting the wearer, while the use of pads that closely conform to the body would compete against the design characteristics of such shoulder pads, which must be raised above the shoulder to provide the amount of protection for which they are engineered, by allowing the flexing yoke to work as designed.

What is needed, then, is a pad better able to absorb, deflect, or disperse impact energy and forces, optimally while allowing for increased wearer flexibility and mobility.

SUMMARY OF THE INVENTION

In some aspects, the invention relates to a foam padding having a first foam pellet having an aperture substantially near a minor axis thereof.

In other aspects, the invention relates to a foam padding having a plurality of foam pellets, at least one of said foam pellets having an aperture substantially near a minor axis thereof.

In other aspects, the invention relates to a protective foam pad having a first textile layer adapted to enclose a protected area; and a plurality of foam pellets arranged in an array and disposed along the first textile layer, where at least one pellet has an aperture through the pellet substantially near the minor axis.

In other aspects, the invention relates to pads for use in athletic competitions having a first textile layer adapted to receive an upper body of a wearer; a second textile layer sewn to the first textile layer to form a plurality of enclosed pockets; and a plurality of foam arrays arranged in the plurality of enclosed pockets, each foam array having a plurality of foam pellets having an aperture substantially near a minor axis thereof, and a substrate connecting the plurality of foam pellets.

Shoulder pads for use in athletic competitions having a padding rig having an inner textile layer; an outer textile layer; and a plurality of foam pellets sandwiched between the inner textile layer and outer textile layer, said pellets having an aperture substantially near a minor axis thereof, where the foam pellets are arranged about the padding rig.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

First disclosed herein is a padding configuration that may be used in shoulder pads and other wearable equipment. While traditional padding configurations employ panels or sheets of foam or other padding material exhibiting substantial uniformity across their surface area, the inventors direct attention to constituent areas or sizes of the padding material.

Figure 1A:
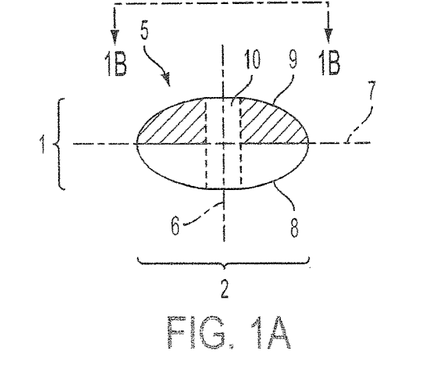
FIGS. 1A-1E show a foam pellet in accordance with one embodiment as disclosed herein.
Figure 1B:
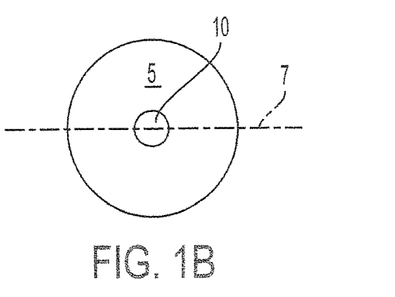
Figure 1C:
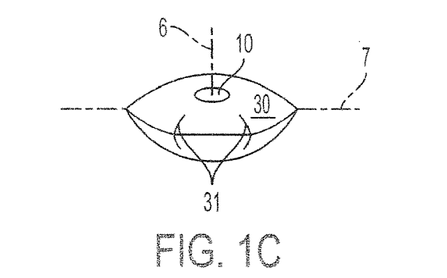

Turning to the drawings, an exemplary embodiment of a foam pellet 5 is shown in FIGS. 1A-1C. Pellet is used to describe any mass that may be variously described as a ball, nugget, segment, peanut, globe, lump, spheroid, ovoid, ellipsoid, lentoid, polyhedron, of any flexibility, consistency, or hardness and having at least some of the characteristics further described in this disclosure. FIG. 1A depicts a cross-section of a foam pellet 5, while FIG. 1B depicts a top plan view of the same pellet 5. For sake of discussion, pellet 5 is shown with a height 1 and a width 2, though it will be understood that "height" and "width" do not necessarily bear any relation to vertical or horizontal orientation, and instead "height" refers to the measure taken along the minor axis 6, and "width" refers to the measure taken along the major axis 7. In the shown embodiment, pellet 5 is generally lobular, presenting a generally circular cross-section when viewed along the minor axis 6, and a generally elliptical or oval cross-section when viewed along its major axis 7. This shape is also known variously as a lentoid or oblate spheroid. In some embodiments, the pellet 5 has a width of approximately 1.25 inches and a height of approximately 1 inch. In other embodiments, the pellet 5 may have different dimensions corresponding to the dimension of the area being padded, or the magnitude of protection to be provided by the padding.

Figure 1D:
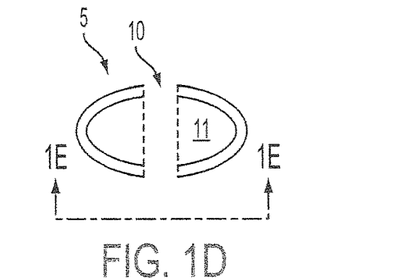
Figure 1E:
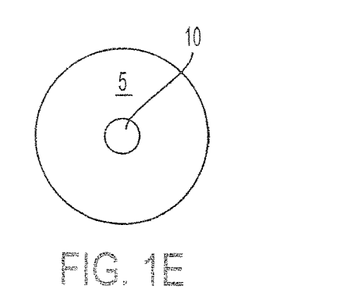

Other shapes in which the height at the perimeter of pellet 5 is less near the perimeter than at more central points may also be provided. For example, with reference to FIG. 1A, the portion of pellet 5 appearing above the major axis 7 may be conical or frustro-conical, or may be a three-dimensional polygon with inwardly and upwardly slanted sides. Alternatively, the pellet 5 may have the appearance of a torus. Also alternatively and as depicted in FIG. 1C, pellet 5 may be in the form of polygonal pellet 30, having creases 31 such that when viewed along the minor axis 6 the polygonal pellet 30 has the appearance of a hexagon. It is contemplated that still other shapes may be used, including those that present inner chambers or voids 11, such the pellets 5 shown in FIGS. 1D and 1E.

The foam used for the pellets may be open-cell or closed-cell foam. The inventors have identified polyurethane and ethylene-vinyl acetate (EVA) foam as having particular advantages, but any other foam compositions may be used, for example, polyethylene foam, polyurethane memory foam, polyether foam, and viscoelastic polymer gel.

In certain embodiments, the pellet 5 has a hole or aperture 10 passing through pellet 5 along the direction of the minor axis. As depicted in FIG. 1A and FIG. 1B, the aperture 10 may be coincident with or pass directly along the polar axis 6, such that when viewing the pellet 5 along the polar axis 6 the aperture 10 is concentric with the circumference of the pellet 5. In other embodiments, the aperture 10 may be eccentric, such that it is not centrally located on the pellet 5. In embodiments wherein the pellet 5 has a 1.25 inch diameter, the aperture 10 may have a 0.25 inch diameter, such that the pellet-aperture ratio is 5:1. The inventors have found that this pellet-aperture ratio at this pellet size allows the pellet 5 to absorb and deflect additional energy while not adversely affecting the strength or integrity of the pellet 5. Other aperture diameters and pellet-aperture ratios may be used without departing from the scope of this invention.

Used together, or to a lesser degree separately, the disclosed shape of the foam pellet 5 and the configuration with an aperture 10 through the pellet 5 provides increased protection for the padded object or body part. In foam pads having flat sides that are substantially perpendicular to the surface of the padded object, impacting forces transfer most of the impact energy through the pad and into the padded object. It is believed that prior art foam panels in such a configuration primarily respond to impacts by compression. Without limiting the scope of the invention, the pellet 5 as disclosed herein is believed to have a greater capability for responding to such forces by not only compressing, but also by deforming to the side (e.g., its apex shifting sideways), or by deforming inwardly to intrude into the space presented by aperture 10. The pellet 5 as taught also presents additional angles for receiving the initial impact force. The aperture 10 also has the additional benefit of providing increased ventilation for the protected area. This helps keep the wearer cool while exerting himself or herself during typical athletic play.

Returning to FIG. 1A, in some embodiments the foam pellet 5 is constructed of foam having variable density across the cross-section of the pellet 5. For example, in the embodiment depicted in FIG. 1A, one half 8 of the pellet 5 is formed of foam having one density, and the other half 9 of the pellet 5 is formed of foam having a second, lower density. The different density foam halves are placed adjacent one another, and may be bonded together, to form the pellet 5. When used to protect a wearer, the low-density half 9 may be worn close to the body to provide additional cushioning, while the high-density half 8 has greater impact absorption. Other embodiments of the pellet 5 may have more than two regions of density (for example, two low density regions sandwiching a higher-density core, or a series of progressively increasing or decreasing density regions), a gradient of densities, or a uniform density without departing from the scope of this disclosure. Such a plurality of regions having different densities, within a single pellet 5, may be achieved by separately forming portions of the foam and coordinating their placement (whether permanently joined together or simply placed near one another to complete the pellet). Alternately, the plurality of regions having different densities may be constructed into a single integrally constructed pellet 5, such as by causing a portion of the foam material in the mold to be cured under different conditions, or with different composition, than other portions. For example, in a mold for which foam material is injected from the top, the bottom portion may be injected as a first mixture of foam chemical, with a second mixture—or the same mixture with a different physical treatment (e.g., entrained air)—deposited on top.

To protect a wearer, an array of pellets 5 may be coordinated to cover a large surface area of the body. In some embodiments, the pellets 5 are independent of each other, such that each pellet 5 reacts to impact forces independently of the other pellets 5 and can shift, expand, compress, and absorb impact forces independently of the other pellets 5. In such embodiments, a covering, wrap, fabric, or other enclosure may be used to keep the pellets 5 organized in the array about the surface.

Figure 2:
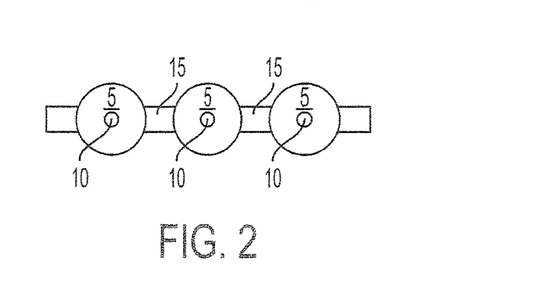
FIG. 2 shows a foam pellet array in accordance with one embodiment as disclosed herein.

In other embodiments, and as depicted in FIG. 2, pellets 5 in an array are connected by substrates 15 to cover a region. In FIG. 2, the pellets 5 are connected linearly by multiple substrates 15. Because the pellets 5 are connected together, the ability of each pellet 5 to shift about independently is reduced. However, presenting multiple pellets 5 connected as a unit permits the padding to be applied over larger surface areas while presenting the pellets 5 in a uniform or other pre-determined arrangement or orientation. Production may also be eased by such arrangements, in view of the potential uniformity and ease of handling sheets of materials as opposed to individual pellets 5.

The substrates 15 may be produced independently of pellets 5 and subsequently connected to form the array. In some configurations, the substrates 15 are different materials from the pellets 5, such as lines or a web of fabric, plastic, wire, or netting. Such materials may be adhered to the pellets such as by gluing to or piercing through the pellets 5. Alternately and perhaps advantageously, the substrates 15 may be formed into the pellets 5 as part of the manufacturing of such pellets 5. For example, if the pellets 5 are produced by molding in which a mold for the top half of multiple pellets 5 is brought together with a mold for the bottom half of such pellets 5, a net, web, or fabric (or other structure for substrates 15) could be introduced between the two mold halves during formation of the pellets 5. Upon curing, and release from the mold, the pellets 5 would be disposed in the pre-arranged configuration about the structure of the substrates 15, with that structure passing through the pellets 5 and effectively embedded therein. It is also possible to form the substrates 15 in the molding process out of the same molding material that is used to make pellets 5. By so doing, the pellets 5 and substrates 15 may be made integral to or unitary with one another. The array thus may be in the form of a sheet or foam panel, configured as pellets 5 dispersed about the sheet or panel in a desired arrangement, interconnected by thinner areas of foam.

In some embodiments wherein molds for a top half and bottom half of the pellets 5 are brought together, the molds may be brought directly into contact with each other. In other embodiments, the top mold may be affixed to one side of a piece of cloth, fabric, or mesh, and the bottom mold may be affixed to the other side of the cloth, fabric, or mesh. It is preferred, though not required, that the cloth, fabric, or mesh be "breathable" such that air flow across the pellets 5 or apertures 10 is not cut off, thereby preserving the cooling effect described above. The use of a cloth, fabric, or mesh increases the durability of the foam pad by providing an intermediate layer between the top and bottom halves of the molds that is tougher than the foam when the pads or pellets 5 are impacted by lateral forces that tend to create shear forces on the connection between the two molds and result in tearing along the seam.

Figure 3:
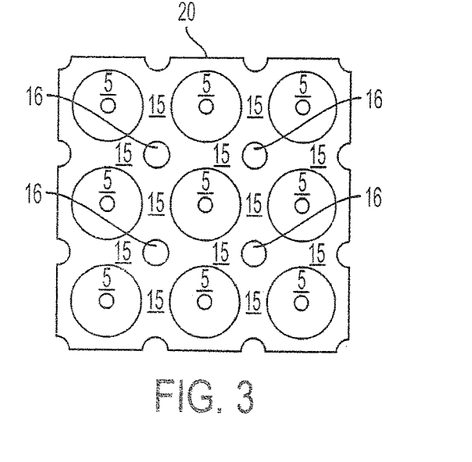
FIG. 3 shows a foam pellet array in accordance with one embodiment as disclosed herein.

FIG. 3 depicts an embodiment wherein an array 20 of pellets 5 are laid out over an area and connected by a web 17 of substrates 15, which connect pellets 5 in two dimensions. In this manner, a large surface may be covered and a large pad of pellets 5 efficiently produced. In order to allow the pellets 5 to be as independent as possible, holes 16 are provided in the web 17 to allow for additional flexibility. The substrates 15 could be formed as independent links between each adjacent pellet 5 if desired, but it has been found that using a configuration in which the holes 16 are round aids in resistance to tearing by avoiding point stresses that may arise at more angular junctions of foam.

Figure 4:
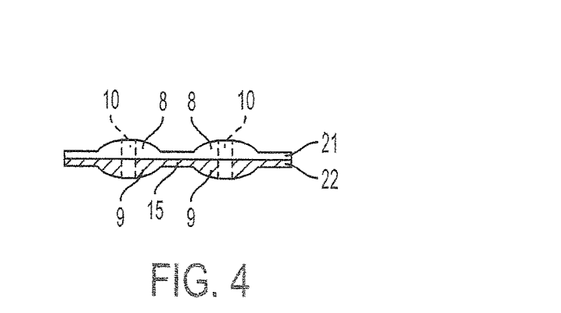
FIG. 4 shows a cross-section view of a foam pellet array in accordance with one embodiment as disclosed herein.

FIG. 4 depicts a side cross-section view of the array 20 depicted in FIG. 3. In this embodiment, high-density halves 8 are formed in a sheet 21 with the substrates 15. Similarly, the low-density halves 9 are formed in a sheet 22 with the substrates. The sheets 21 and 22 are then arranged with the high-density halves 8 and the low-density halves 9 aligned, forming the pellets 5. In most cases the halves 8 and 9 will be glued or otherwise bonded together, but in some cases they may be arranged and held in relative position by other structures, such as a fabric covering. Holes 16 may be formed as part of the molding process, or may be cut following molding. Likewise, apertures 10 may be formed as part of the molding process for the pellets 5 (whether such molding occurs as part of an array, or separately), or may be bored through each pellet 5 as a subsequent step in the manufacturing process. If both the aperture 10 and the holes 16 are to be bored subsequent to molding, these holes may be punched by a single jig with coring punches for forming each.

In any given array 20, the pellets 5 may be of uniform or varying size. For example, in an application where the impact forces are generally uniform over a large area, or the protected surface area does not substantially move, shift, translate, rotate, or hinge (for example, a wearer's chest or torso), the pellets 5 may be of a substantially uniform size. In other applications, where the impact forces vary across the protect surface area, or the surface is one likely to deform (for example, around a wearer's elbow, knee, or shoulder), pellets 5 of varying sizes may be used to increase flexibility and provide localized protection.

The pellets 5 described above may be used in a multitude of forms to provide padding to a wearer, particularly in athletic contests and in workplaces where safety from impacts is a concern. For example, the foam pellets 5 and arrays 20 may be used in football shoulder pads, knee pads, thigh pads, elbow pads, helmets, braces, chest protectors, football kick plates, impact plates, and other athletic or protective equipment. The pellets 5 and arrays 20 may also be advantageously incorporated into other equipment, such as horse blankets, saddles, cycling seats, firefighter equipment (e.g., helmets, firemen's coats and pants, etc.), bomb disposal safety suits, construction workers' clothing, hard hats, and other protective clothing, padding, or gear. In these various uses, the pellets 5 and arrays 20 may be designed to particular sizes and arranged into padding of particular shapes to protect a given surface area commensurate with the standard padding used. For example, in a horse blanket, the padding may be shaped as a traditional blanket to protect the wearer and the horse while riding, with due variances in the size of the pellets to absorb or deflect impacts between horse and rider during standard equestrian or horse racing actions.

For further example, in some embodiments, the pellets 5 or arrays 20 of pellets 5 may be used integrated into or as a component for use with football shoulder pads to provide the user protection from impacts while also allowing the user to move the arms, shoulders, and neck relatively unhindered. Pellets 5 may be incorporated into, or substituted for, the padding of traditionally configured football shoulder pads for improved performance.

Figure 5:
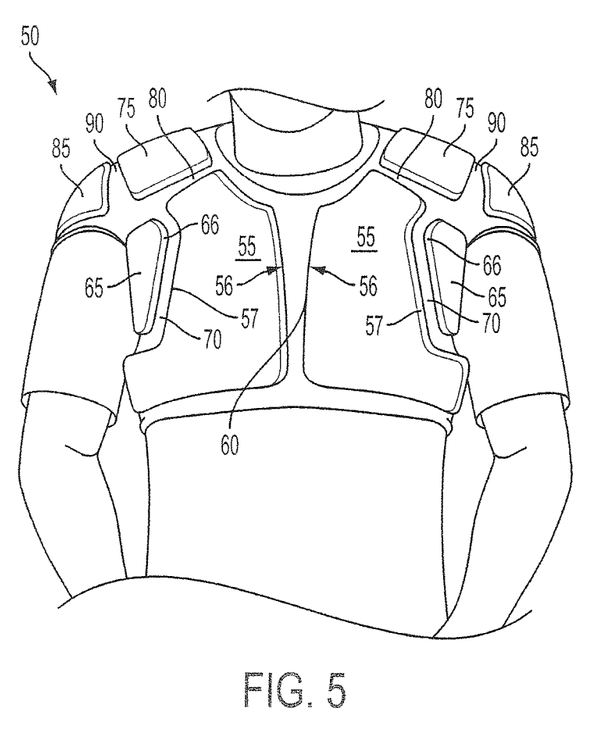
FIG. 5 shows a front elevation view of one embodiment of a padding rig as disclosed herein.
Figure 7:
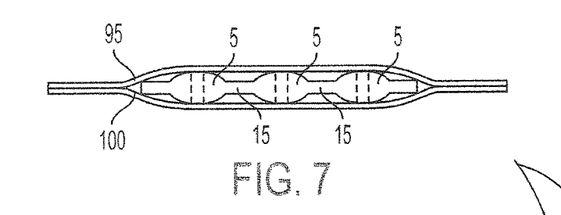
FIG. 7 shows a cross-sectional view of an array of foam pellets sewn between fabric layers in accordance with one embodiment as disclosed herein.
Figure 8:
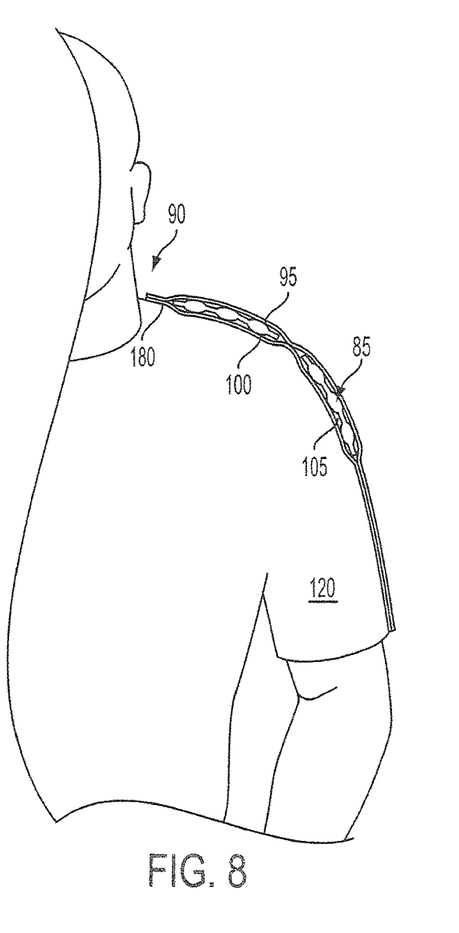
FIG. 8 shows a cross sectional view of an array of foam pellets in a padding rig in accordance with one embodiment as disclosed herein.
Figure 9:
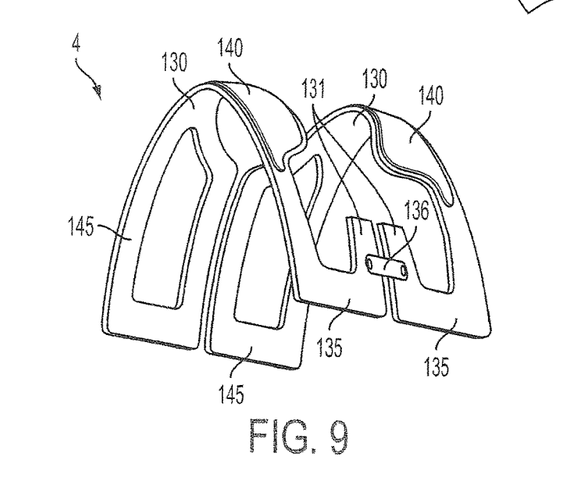
FIG. 9 shows a perspective view of a yoke in accordance with one embodiment as disclosed herein.

Additionally, FIG. 5 through FIG. 9 show an improved configuration for football shoulder pads that may incorporate the pellets 5 disclosed above in appropriate locations. In general, the described configuration of football shoulder pads includes a padding rig 50, which may if desired be in the form of a shirt or vest as shown in FIG. 5, and an outer impact plate 4 such as depicted in FIG. 9. In the shown application, the padding rig 50 is placed on the wearer, then impact plate 4 is placed over the padding rig 50 to provide a set of football shoulder pads having inner padding and outer arches. An exemplary construction of these components is hereafter described.

FIG. 5 depicts a front elevation view of one embodiment of padding rig 50 as worn by a wearer. The padding rig 50 is shown with several pads separated by grooves and configured to protect the wearer while also allowing the wearer to flex or move freely, which may also facilitate donning of the padding rig 50.

In the embodiment of FIG. 5, the padding rig 50 has two chest pads 55 to provide padding over the wearer's front rib cage. The chest pads 55 are separated by a central groove 60 aligned over the wearer's sternum. The chest pads 55 cover the front rib cage, extend down to be roughly level with the user's diaphragm, and wrap towards the side of the wearer's chest along the diaphragm. Serratus pads 65 are positioned along the side of the padding rig 50 between the chest pads 55 and the wearer's underarm. The serratus pads 65 are roughly aligned with and serve to protect the side of the rib cage and the user's serratus anterior muscles. The serratus pad 65 and chest pad 55 are separated by an anterior groove 70. The embodiment of FIG. 5 also has clavicle pads 75 located over the top of the shoulder between the neck and the round of the shoulder. Clavicle pads 75 are roughly aligned over and serve to protect the clavicle, or collarbone. A lateral groove 80 separates each clavicle pad 75 from the respective chest pad 55. Further the embodiment of FIG. 5 has deltoid pads 85 to protect the deltoid muscles and the round of the shoulder. Each deltoid pad 85 is separated from the clavicle pad 75 by a shoulder groove 90.

Pads within the padding rig 50 as described above may use either multiple foam pellets 5 independently set throughout the pad, or an array 20 of pellets 5 provided within the pad. The pellets 5 (or array 20) may be configured to have different foam densities in various pads. For example, small pellets 5 or uniform foam pads may be used in the serratus pads 65 to allow for maximum flexibility and motion of the wearer's arms. However, larger pellets 5 may be used in the chest pads 55, which are more likely to be impact locations in football, for example. Other variations in the size, density, and concentration of the pellets 5 or arrays 20 may be used for other pads, depending on the manner in which the wearer is likely to receive an impact. It is not necessary that all padding in the padding rig 50 be of the structure taught for pellets 5 or arrays thereof, but it is preferred that at least the chest pads 55 or the clavicle pads 75 incorporate such pellets 5. However, the description and use of a padding rig 50, whether with or without the use of the yoke 130 as described further below, is not limited strictly to the padding or pellets 5 described herein, but rather may include padding of a any shape, material, or structure for any or all of the pads described on the padding rig 50 herein.

Also, while FIG. 5 depicts one configuration of pads and grooves, other configurations are also possible to protect the wearer. For example, a single chest pad 55 covering the entire chest may be used. Alternatively, the chest pad 55 and serratus pad 65 may be fused together, or the serratus pad 65 may be larger relative to the chest pad 55 than as is depicted in FIG. 5. Similarly, the clavicle pad 75 and deltoid pad 85 may be fused together or have different relative sizes than as shown in FIG. 5. Furthermore, each individual pad individual may be broken into multiple smaller sections. In view of the particular need for flexibility at the shoulder, as players need to raise their arms for catching, throwing, or tackling, the deltoid pad 85 may particularly benefit from sectioning into smaller arrays or individual pellets 5, to allow that region to move by expanding multiple spaces between multiple smaller sections, as opposed to relying on fewer, areas for larger expansions (and therefore a larger area exposed from padding). All of these alternative embodiments and others are within the scope of this disclosure.

Figure 6:
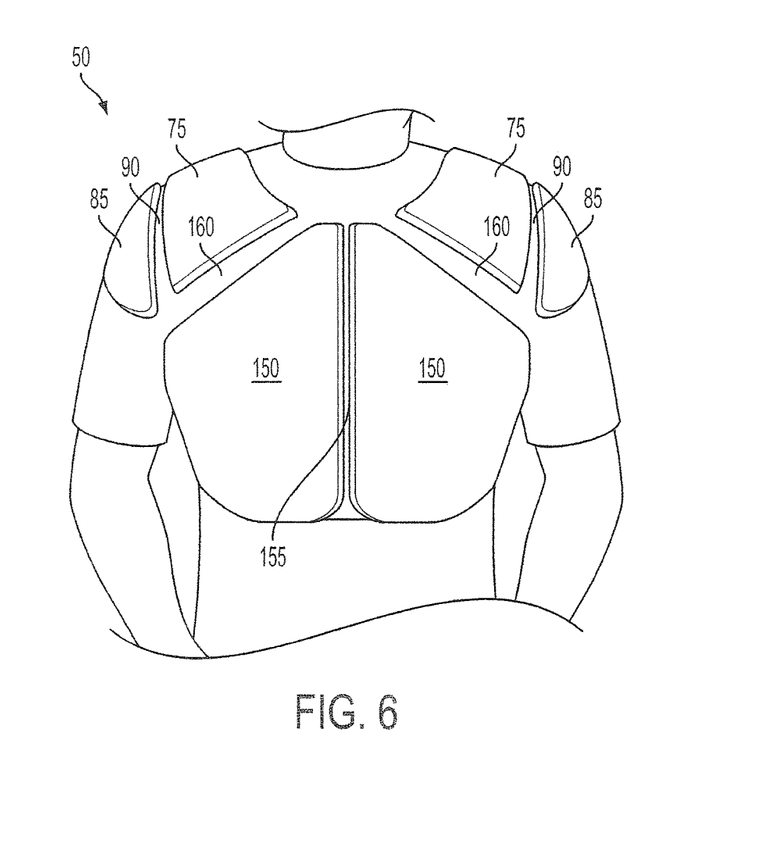
FIG. 6 shows a back elevation view of one embodiment of a padding rig as disclosed herein.

FIG. 6 depicts an elevation view of one embodiment of the back of the padding rig 50. Two back pads 150 protect the wearer's upper back. The back pads 150 are separated by a central back groove 155, similar to the central groove 60 separating the chest pads 55. Each back pad 150 is separated from a clavicle pad 75 by a posterior lateral groove 160. As with the front padding, in alternative embodiments the back pads 150 may be joined into a single pad or subdivided into multiple pads.

In some embodiments, and as depicted in FIG. 7, the chest pads 55, serratus pads 65, clavicle pads 75, and back pads 150 may be sewn between two fabric layers 95 and 100. FIG. 7 shows an array 20 of pellets 5 connected by substrates 15 and covered by two layers of fabric 95 and 100. The outer fabric layer 95 covers the outside of the padding, while the inner fabric layer 100 is between the wearer and the pad. This two-ply construction protects the padding rig 50 from incidental wear and tear while also protecting the skin of the wearer from chafing or other potentially uncomfortable contact with the foam pads. In some embodiments, the outer layer 95 may be sewn to the inner layer 100 to form a series of grooves, as further described below, and serried enclosed pockets where the pads located. The serried pockets subdivide the padding rig 50. By situating the pads in the enclosed pockets, the pads are prevented from shifting about or folding over during play. Rather, the pads are maintained in place by being sandwiched between the inner layer 95 and the outer payer 100 inside the enclosed pocket.

In other embodiments, a single-ply fabric may be used. For example, the pads may be adhesively attached to the front of the fabric layer 100 with an exposed pad surface. In such an embodiment, the fabric 100 is between the wearer's skin and the pads. Alternatively, the pads may be adhesively attached to the single-ply fabric 95, such that the fabric 95 covers both the pad and the wearer, with the pads adjacent to the skin. Additionally, the pads may be secured to the fabric by any appropriate method for affixing the pad to the fabric 95, such as by adhesive, glue, tape, Velcro™, hot wax, stitching, or other mechanism. In some embodiments, the pad may be permanently affixed to the fabric 95, whereas in other embodiments the pads may be removable from the fabric 95. Removable pads would be useful for customizing a padding rig 50 to a particular player of a particular size and playing a particular athletic position. As the player grows or is injured, thereby requiring different amounts or locations of padding, or as the padding rig 50 is donned by other players, the pads may be removed or moved about as necessary to provide the appropriate protection.

While any type of fabric may be used to allow the wearer to don the padding rig 50, the inventors have found that in some embodiments a compression fabric or other high tenacity stretch fabric that forms a close-fitting garment provides additional advantages. In particular, compression fabric conforms the pads of the padding rig 50 close to the body and prevents the pads from shifting during the course of play.

In some embodiments, the deltoid pads 85 may be sewn between an outer layer 95 and inner layer 100 of the fabric, as described above with reference to FIG. 7. In other embodiments, as depicted in FIG. 8, the deltoid pads 85 are separate from the inner layer 75 of fabric. In this embodiment, each deltoid pad 85 is covered by an outer layer 95 over the outside and a middle layer of fabric 105 that wraps underneath the deltoid pad 75 and is attached to the inner layer 100 of fabric at a seam 110 located underneath the deltoid pad 75. The middle layer 105 may be formed together with the top layer 95, or it may be sewn into a seam with the top layer 95 along the edge of the deltoid pad 85. In either case, separating the deltoid pad 85 from the inner layer 100 in this manner allows the wearer to rotate or move the upper arm relatively independent from the deltoid pad 85. The inner layer 100 extends down the upper arm to form the sleeve 120.

Returning to the embodiment depicted in FIG. 5, the central groove 60, anterior grooves 70, lateral grooves 80, and shoulder grooves 90 are each wide enough to form a seam 125. If the fabric is compression fabric, the seam 125 optimally should be wide enough to create an overlapping seam between the different layers of fabric, such that the seam 125 can stretch proportionally as the fabric is stretched. If compression fabric is not used, the seam 125 can be very thin, and the grooves can be correspondingly thin. The grooves are areas without padding and allow each pad to shift with the wearer's movements independently of the other pads. Thus the wearer can move the muscles of his shoulders, upper arm, upper back, and chest relatively freely, without having to move, or being restricted by, the remainder of the shoulder pads 50.

In some embodiments, the grooves may be sized such that when a wearer shifts into particular positions in which a tackle, hit, blow, or other impact is likely to occur, the pads shift together to simulate the appearance and provide the protection of a single solid pad. For example, in football, a defensive player may set himself into a crouch with arms extended forward to tackle the ball carrier. In this position, the chest pads 55 and serratus pads 65 would be forced forwardly and inwardly by the wearer's stance. The chest pads 55, which are normally separated by the central groove 60, would collapse toward each other until the central edges 56 of the chest pads 55 are adjacent to each other. Similarly, the serratus pads 65 would be forced toward the chest pads 55, such that the interior edges 66 of the serratus pads 65 slide next to the exterior edges 57 of the chest pads 55. In this manner, the serratus pads 65 and chest pads 55 form the appearance of a single pad across the wearer's chest in order to protect the wearer during the impending tackle.

Similarly, the clavicle pads 75 and deltoid pads 85 can protect a wide receiver leaping to catch a high pass, or a quarterback in the motion of throwing a ball. As the wearer's arm is raised, the player's deltoid and shoulder contract toward the neck. Accordingly, the deltoid pad 85 shifts inwardly to sit adjacent to the clavicle pad 75, simulating a single, solid pad stretching over the top of the shoulder towards the neck.

In some embodiments, and as further described with reference to FIGS. 9-11 below, the padding rig 50 may be augmented with an impact plate 4. In other embodiments, the padding rig 50 alone may be worn by the wearer to provide protection. This may be particularly advantageous during low- and medium-impact play, such as during practices where tackling is not allowed, or where the players otherwise conduct "no pad workouts." In "no pad workouts," players typically remove their traditional hard plastic and other bulky padding in order to both protect players' health long term, deter or limit the amount of impacts taken by the body during practice, and focus on game planning and strategy. The padding rig 50 described herein is suitably flexible to allow players to conduct practices and drills without the bulkiness of traditional football shoulder pads, while also providing additional protection in the event of an inadvertent fall, hit, tackle, or other impact. In some of these embodiments, the padding rig 50 may take the form of a shirt, bib, drape, or harness worn over the upper body and abdomen, with pads to protect the wearer where appropriate. Such embodiments of the padding rig 50 could be used in actual gameplay, with or without the impact plate 4 described below.

In other embodiments, and having particular advantages during games and other high-impact play, an impact plate 4 is provided over each shoulder, in the nature of a hard exoskeleton or yoke 130 as shown in one embodiment in FIG. 9 to further support the pads of the padding rig 50 and protect the user. As depicted in FIG. 9, the yokes 130 may be joined to form a single construction, for example by connecting each yoke 130 with a rigid or flexible plastic connection 136 across the front section 135 of the yoke. Alternatively, one yoke 130 may be separate from and move independently of the other yoke 130. Any hard material may be used to form the yokes 130. The inventors have found that recycled carbon fiber yokes 130 provide more protection than hard plastics or other rigid materials, as the recycled carbon fiber plates can be conformed to the radius of the shoulder and tend to absorb and release back impact energy rather than transferring it unto the wearer. Furthermore, the recycled carbon fiber can be manufactured at a very thin thickness (for example, 4-8 sheets of carbon fiber, resulting in a thickness of 0.5-0.8 mm). Recycled carbon fiber sheets having this thickness is flexible and can react to impact forces by absorbing the impact and springing back into shape. This allows the yoke 130 to flex with the wearer in order to not hamper the wearer's flexibility or mobility. In such ultrathin embodiments, and as depicted in FIG. 9, the edge of the yoke 130 may be surrounded by a pad or seam 131 to prevent the yoke 130 from inadvertently cutting into the wearer or the padding rig 50. However regular carbon fiber or typical hard plastics may be used without departing from the scope of this disclosure.

The yoke 130 may be constructed in the general pattern typical of the prior art, being essentially flat on the front and covering an area approximately four to six inches wide (on each side) for an adult model. In the embodiment depicted in FIG. 9, the yoke 130 is constructed of carbon fiber as discussed above, and therefore is able to have a reduced profile. As shown, yoke 130 has a front section 135 that is widest at the base of the neck where the clavicle requires protection. However, contrary to typical traditional shoulder pad yokes, the yoke 130 as shown in FIG. 9 has a cut-out section relying on a narrower band of material to protect downward, across the bottom of the rib cage, and then upward again. As shown, this section looks like a "J" or a backwards "J" in appearance. The omission of material in locations typically covered by traditional shoulder pads is most appropriate when the padding rig employs pellets 5 in the area exposed by the omitted material, or when the yoke 130 is constructed of carbon fiber as suggested, or optimally, both. Even without such aspects, the upward projecting portion 131 of the yoke 130 serves to offset the lack of material in the yoke 130 and thereby provide a weight and cost savings to the yoke 130 overall, while still maintaining a protective profile.

Turning to the back section 145 of the yoke 130, here also cut-outs are employed to reduce weight and cost. As shown here, the material of the yoke 130 encircles the cutout, as opposed to the open-sided cutout shown on the front section 135. In consequence, the configuration of the back section 145 has an appearance somewhat reminiscent of a block "O" design to protect the player's back and rib cage in the same manner. The use of such a stronger O design with both sides intact on the back as compared to the single-sided J on the front is believed appropriate in view of the fact that strikes to the front are more likely to be deflected or met by the arms of the player. The "J" and block "O" shapes provide increased protection over the wearer's rib cage while also covering less space over the wearer's chest and back, thereby reducing the weight of the yoke 130 and any resistance against the wearer's flexibility or mobility. This permits the wearer to move relatively unhindered by the yoke 130, compared to stiffer or heavier yokes 130. Additionally, the open designs of the J and 0 shapes advantageously contribute to ventilation to cool athletes during play. However, other shapes for the front section 135 and back section 145, such as solid plates, one or more strips extending down from the middle section 140, or plates having multiple holes or cut outs, may be used without departing from the scope of this disclosure.

The middle section 140 of the yoke 130 is rounded and protects the wearer's shoulder and clavicle. As depicted in FIG. 10, a protrusion 141 may extend inward and downward to protect the collarbone. As depicted in the embodiment of FIG. 10, the front section 135, middle section 140, and back section 145 may be formed of a unitary construction or mold. Because the padding is integrated into the shirt, it is unnecessary to include a buckle or other device to secure the yokes 130 to each other in some embodiments.

In some embodiments, the yoke 130 may be of varying thicknesses in different sections in order to provide additional strength in locations where particularly high impacts are anticipated. In these embodiments depicted, the flexibility of the yoke 130 in various sections is dependent upon its thickness. For example, and as depicted in FIGS. 9 and 10, the front section 135 and back section 145 are thinner than the middle section 140 to provide additional flexibility across the chest and back, while the middle section 140 is thicker relative to the front section 135 and back section 145. in view of the higher impact forces experienced across the shoulders when a player tackles another player. In other embodiments, the yoke 130 may be thicker in the back section 145, for example, which may be particularly advantageous for wide receivers who are prone to being tackled from behind or in mid-air. Other variations in the thickness and/or flexibility of the yoke 130, including gradual increases or decreases in thickness across a section or in particular regions, may also be used.

Figure 10:
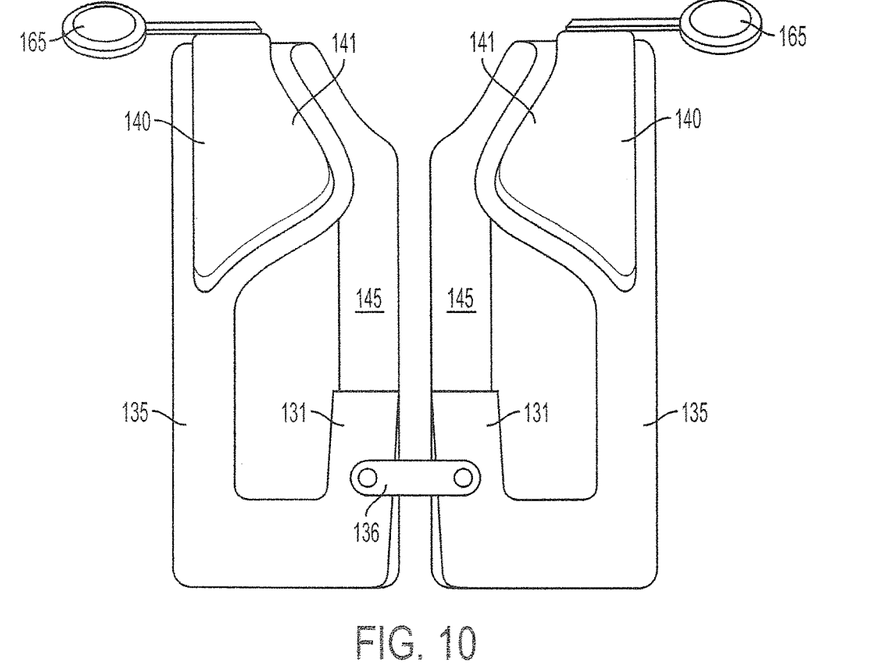
FIG. 10 shows a front elevation view of a yoke in accordance with one embodiment as disclosed herein.

In some embodiments, and as depicted in FIG. 10, to further protect the "point" of the shoulder and the deltoid muscle, an epaulet 165 may be attached to the middle section 140 and extend over the deltoid pad 85. The epaulet 165 may be formed of carbon fiber or hard plastic. Preferably, the epaulet 165 is attached only to the yoke 130, such that the epaulet 165 is substantially independent of and may react to impact forces separately from, the deltoid pad 85. However, this is not required in all embodiments.

Figure 11:
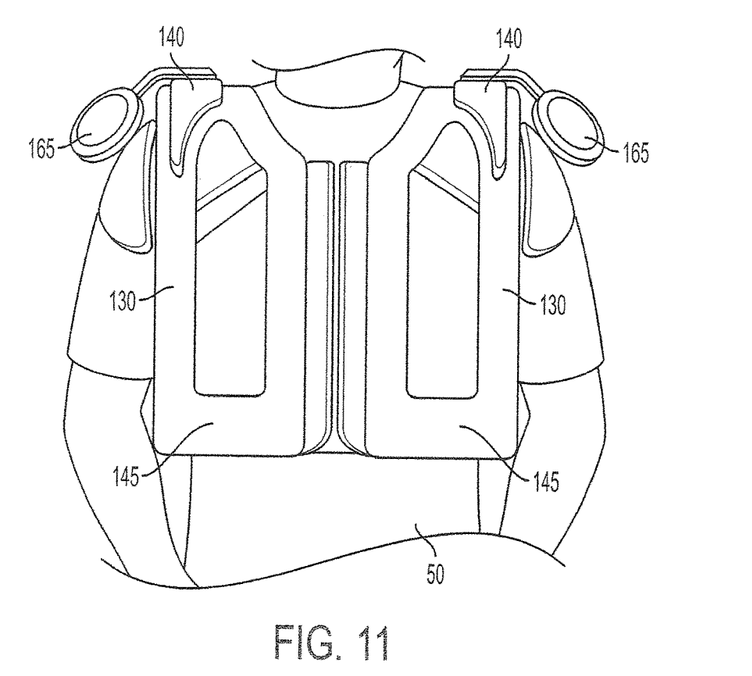
FIG. 11 shows a back elevation view of a yoke in accordance with one embodiment as disclosed herein.

In some embodiments, and as depicted in FIG. 11, the yokes 130 forming the impact plate 4 may be completely detached from the padding rig 50. In other embodiments, the yoke 130 may be secured to the shirt by VELCRO™, double-sided tape, or some other detachable means of adhering the yoke 130 to the padding rig 50. To don embodiments of the shoulder pads that have the impact plate 4 detached from the padding rig 50, the wearer first puts on the padding rig 50. Then, the wearer slips a yoke 130 over each shoulder, aligns the yoke 130 over the padding rig 50, and then affixes the yoke 130 to the padding rig 50 as appropriate. In other embodiments, the impact plate 4 may be slipped over the padding rig 50 before the entire assembly is donned at once by the wearer.

While the shoulder pads described above are most likely to be used in football, similar configurations may be used for hockey, rugby, lacrosse, and field hockey players. Additional chest protectors for baseball or softball catchers may also have similar configurations.

A padding rig 50 with an impact plate 4 may be used in other athletic and non-athletic environments where impact protection is important. It will be appreciated that the padding rig 50 and the impact plate 4 may be configured in a size and shape appropriate to the body part or structure to be protected. For example, in another embodiment, a soccer shinguard has a padding rig 50 adapted to conform to the player's shin and has one or more pockets enclosing foam padding as described above. A thin impact plate 4 covers the outside of the padding. In some embodiments, the impact plate 4 is integrated into the padding rig 50; for example, it may be sewn into the enclosed pocket with the foam padding. In other embodiments, the impact plate 4 may be slid over and attached to the padding rig 50, or the padding rig 50 may be removably received in a sleeve portion of the padding rig 50, giving the player the option of wearing the hard impact plate 4 or simply playing with the softer padding rig 50.

In other embodiments, a helmet may be formed having foam padding on the interior of the helmet and a hard impact plate 4 or shell on the exterior. The same concept may be used for football, hockey, lacrosse, and rugby helmets, as well as firemen's hats and construction hard hats.

In still other embodiments, the padding may be applied to any structure where impact forces are likely. For example, a basketball pole or football uprights may be wrapped in a padding rig 50 with the foam padding inside. If the padding rig 50 is used to protect a fragile, brittle, or easily deformable structure (for example, a thin wooden structural column, as may be used on a patio or deck), an impact plate 4 may be laid over the padding rig 50 to provide additional impact protection. If, alternately, the padding on the structure is intended to protect players or persons that may strike the structure, it may be advantageous for the foam to be outward of any impact plate 4.

The embodiments provided above are intended as examples of potential uses of the foam padding in various applications and is not intended to limit the scope of use or structure of the foam padding, padding rig 50, and impact plate 4, which may be advantageously applied in any scenario where a need for protection against impact forces is anticipated or desired.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A foam padding comprising:
   a substrate layer having a first side and a second side,
   a plurality of first foam oblate spheroid halves of a first density, each half having a flat surface attached to the first side of the substrate layer and a hole passing through the half, and
   a plurality of second foam oblate spheroid halves of a second density, each having a flat surface attached to the second side of the substrate layer opposite one of the first foam spheroid halves and a hole passing through the half,
   wherein each pair of first foam oblate spheroid halves and second foam oblate spheroid halves has a combined height that is less than a width of a first foam oblate spheroid half, and
   further wherein the hole passing through each pair of the first foam oblate spheroid halves substantially aligns with the hole passing through the second foam oblate spheroid halves.

2. The foam padding of claim 1, wherein the diameter of the aperture is approximately one-fifth the width of the first foam oblate spheroid half.

3. A foam pellet for use in providing protective padding, the pellet comprising:
- a substrate layer having a first side and a second side,
- a first foam oblate spheroid half having a first density, attached to the first side of the substrate layer, and having a hole passing through the first foam oblate spheroid half, and
- a second foam oblate spheroid half having a second density, attached to the second side of the substrate layer and having a hole passing through the second foam oblate spheroid half,
- wherein the first foam oblate spheroid half and the second foam oblate spheroid half has a combined height that is less than a width of the first foam oblate spheroid half, and
- further wherein the hole passing through the first foam oblate spheroid half substantially aligns with the hole passing through the second foam oblate spheroid half.

4. The foam padding of claim 3, where the foam is polyurethane.

5. The foam padding of claim 3, wherein the hole has a diameter approximately one-fifth of the width of the foam pellet.

* * * * *